Dec. 12, 1944.  E. D. IBBOTSON ET AL  2,364,849
PROCESS OF MAKING FISHING RODS
Filed July 16, 1943  2 Sheets-Sheet 1

Inventors.
EDWARD D. IBBOTSON
EUGENE SCHMIDT

By Geo. E. Rendell

Attorney.

Dec. 12, 1944.  E. D. IBBOTSON ET AL  2,364,849
PROCESS OF MAKING FISHING RODS
Filed July 16, 1943  2 Sheets-Sheet 2
Fig.11  Fig.12  Fig.13
Fig.14  Fig.15
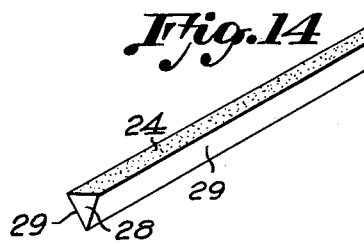
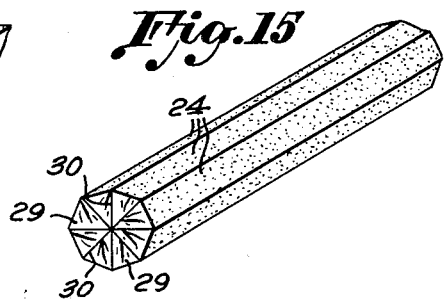
Fig.16  Fig.17
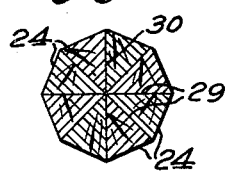
Fig.18  Fig.19  Fig.20
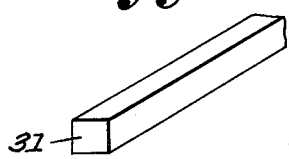
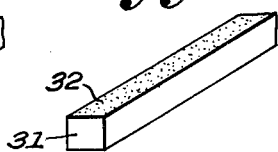
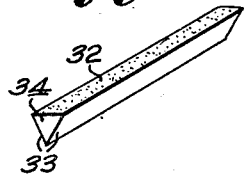
Inventors.
EDWARD D. IBBOTSON
EUGENE SCHMIDT
By Geo. E. Rendell
Attorney.

Patented Dec. 12, 1944

2,364,849

UNITED STATES PATENT OFFICE 2,364,849

PROCESS OF MAKING FISHING RODS

Edward D. Ibbotson and Eugene Schmidt, Utica, N. Y., assignors to Horrocks-Ibbotson Co., Utica, N. Y., a corporation of New York Application July 16, 1943, Serial No. 495,018

5 Claims. (Cl. 144—309)

Our present invention relates to a fishing rod and process for making the same.

The purpose of our invention is to provide a new and improved process of making a built-up fishing rod which process will allow of such built-up rod being made from a greater variety of wood than heretofore, and especially will allow of the tapered beveled strips used to make a built-up rod being formed with other than a natural outside surface of wood such as has heretofore been utilized by employing strips of bamboo with the natural outside surface of the bamboo forming the outside surface of the fishing rod.

A further purpose is to provide a process of making the parts of such built-up fishing rods wherein regular inside wood has one face thereof treated with a wood-penetrating hard-setting substance such for example as resin either natural or synthetic or other wood-penetrating and wood-strengthening and hard setting substance that when set and cured will produce an extremely hard surface like the exterior surface of bamboo besides increasing a considerable extent the strength of the mass of wood.

A further purpose is to provide a series of steps in making the fishing rod wherein after the wood is treated to provide such a hard outside surface the other surfaces of the strip will be formed so as not to injure or damage the said outside surface but will be truly shaped and beveled and tapered to form a true solid rod of similar shaped sections tapering in the desired extent to form an acceptable fishing rod.

A further purpose is to provide a fishing rod constructed according to the foregoing outlined or suggested process.

Further purposes of the invention will appear from the specification and claims hereinafter set forth.

Figs. 7 to 13 inclusive are cross-sectional views at different longitudinal positions along a length of fishing rod or at different longitudinal positions along successively smaller lengths of a rod and showing the effect of the tapering of the pieces or small strips.

Figure 3:
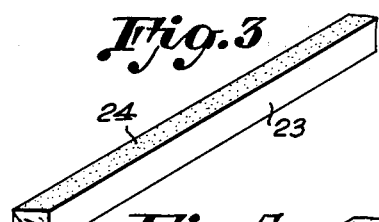
Fig. 3 is an isometric view on an enlarged scale illustrating the smaller strips into which the slab of Fig. 2 is cut.

Fig. 14 is an oblique projection of a beveled and tapered small strip formed from a piece such as shown in Fig. 3, the beveled faces being at an angle of forty-five degrees to each other and at equal angles to the third or outside surface of the strip.

Fig. 15 is an oblique projection of a set of the pieces of Fig. 14 assembled to form an octogonal rod.

Figs. 16 and 17 are cross-sectional views at different points along the rod of Fig. 15 illustrating the effect of the taper of the small strips of Fig. 14.

Figs. 18, 19 and 20 illustrate a modification of our process.

Fig. 18 is an isometric view of a short piece of wood 31 only large enough to have formed therefrom one triangular strip.

Fig. 19 is a similar view of the piece of wood 31 after one surface has been treated by resin or a like-acting substance to form a hard outside surface.

Fig. 20 is a similar view of said piece after it has been beveled and tapered to form the proper triangular strip 34.

Figure 1:
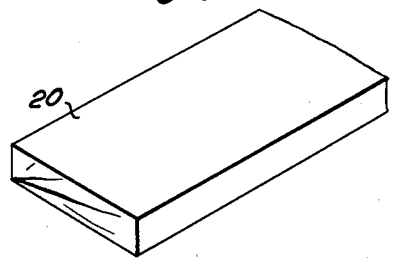
Fig. 1 is an isometric view on an enlarged scale of a portion of a thin slab of wood such as is used to start the steps of our process of making fishing rods.

Referring to the drawings in a more particular description it will be seen that our invention relates to a new process of making a built-up fishing rod and to the fishing rod constructed according to such process. Referring first to the process, it will be seen that Fig. 1 shows on a considerably enlarged scale an isometric view of a short length of a slab 20 of a suitable wood cut as near as may be along the line of the grain of said wood.

Figure 2:
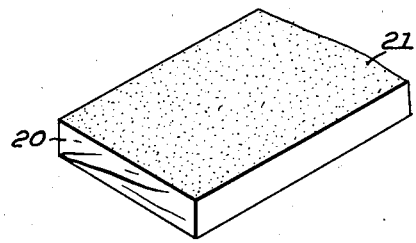
Fig. 2 is a similar view of said slab after it has been coated or treated.

These thin slabs of wood are then coated on one wide surface as 21 with a natural or synthetic resin or other like-acting substance which to some considerable extent penetrates into the body of the wood and to a greater or less extent serves to strengthen the fiber of the wood as by binding the fibers of the wood closely together but more particularly the action of this treating or coating of one wide face of the slabs of wood is to form on the broad face a very hard and durable surface. This treatment of the wood renders the said thin slab 20 very similar to a piece of the said so-called split bamboo in that the slab 20 has a very hard surface 21 and thereunder a more or less successively strengthened mass of wood fiber 22 which can be readily worked. The next step of our process is to saw or otherwise cut the slab of Fig. 2 into smaller pieces such as more or less rectangular pieces 23 of Fig. 3. In the formation of these smaller pieces 23 of Fig. 3 one complete surface as 24 will be a hard surface brought over from the hard surface 21 of the piece shown in Fig. 2.

Figure 4:
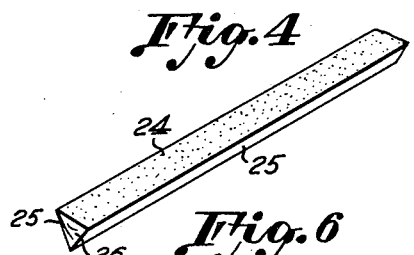
Fig. 4 is an isometric view and Fig. 5 is an oblique projection of a tapered and beveled strip formed from the piece shown in Fig. 3, the beveled faces being at an angle of sixty degrees to each other and forming in cross section an equilateral triangle.
Figure 5:
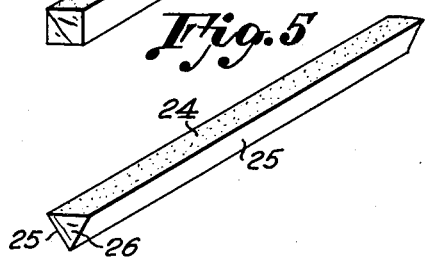
Figure 6:
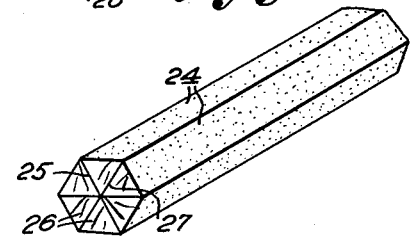
Fig. 6 is an oblique projection of a set of the tapered and beveled parts of Figs. 4 and 5 assembled to form a length of hexagonal fishing rod.
Figure 7:
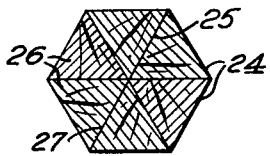
Figure 8:
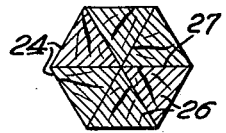
Figure 9:
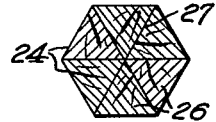
Figure 10:
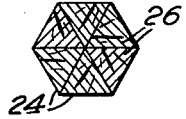

The next step of our process is to shape the smaller strip 23 so as to form a piece triangular in cross section with its beveled faces 25 at an angle of sixty degrees to each other assuming that a six-sided or hexagonal fishing rod is to be produced and at the same time to have these beveled faces 25 taper longitudinally as required for a proper acting fishing rod or length of fishing rod. It will be understood that in following out this step of our invention the hard surface 24 of Fig. 3 will be preserved as the third and outside face of the triangular strip shown in Figs. 4 and 5. The beveling of the smaller strip 23 into the forms shown in Figs. 4 and 5 will of course slightly reduce the width of the outside surface 24, but otherwise special pains will be taken to preserve the hard outside surface 24 during the necessary machining operations for tapering and beveling the inside faces 25 and 25 of these smaller strips as shown in Figs. 4 and 5. At this point it may be noted that the beveled faces 25 are formed of the inside of the slab of wood and not of the outside hard surface 24 so that the beveled faces 25 are better adapted to be cemented to their adjacent faces when as in the next step of our process as shown in Fig. 6 a set of the necessary number as six of the beveled tapered strips 26 of Figs. 4 and 5 are assembled as shown in Fig. 6 to form a six-sided or hexagonal fishing rod or fishing rod length. Assuming that we are forming as suggested in Fig. 6 a hexagonal fishing rod, it will be especially noted that while the strips 26 are equilateral in cross-section, special pains must be taken to see that the outside hard surface 24 is placed at the outside of the fishing rod and that the inner faces 25 are placed to the inside of the fishing rod as these are the faces that will receive the proper layer of the cement to join or cement the said set of beveled faces 25 closely together throughout their entire surfaces so that the said six strips 26 will form a solid rod with the cemented seams 27 extending radially from the center of the rod to the outside of the rod and of course with these cemented joints extending throughout the length of the fishing rod or throughout the extent of the fishing rod length as the case may be. It will be understood that the cement to be used will be of a special high quality cement, that is impervious to water either fresh or salt and that is furthermore unaffected by heat or cold. Ordinarily during the cementing process and until the pieces of a fishing rod become thoroughly set after the cementing process the strips 26 of a set will be tightly bound together throughout a whole length of a fishing rod or throughout the extent of the fishing rod section by a plurality of encircling threads or strings. As these encircling threads are already used in the making of sectional fishing rods, we do not deem it necessary to show the same in any of the views of our process as it is simply a known step in the making of fishing rods and the encircling threads are removed by a proper sanding or other process after the cementing step has been entirely completed.

A common and approved form of fishing rod is that of a six-sided or hexagonal form but our process is equally adapted for making other polygonal forms of fishing rods of which an approved form is an eight-sided or octagonal form. Such a fishing rod is made by forming the strips 23 with their hard outside surface 24 into tapered beveled strips 28 as shown in Fig. 14 wherein the said outside surface 24 is retained as far as necessary to be the outside surface while the other parts of the wood of piece 23 have been cut away to form the two beveled faces 29 at an angle of forty-five degrees to each other and at a greater angle to the outside surface 24. In this way eight of the strips 28 when placed together as shown in Fig. 15 will form an eight-sided or octagonal fishing rod the beveled faces 29 of adjacent faces of which will be cemented together in radiating seams 30 as already described in detail under the hexagonal rod. Figs. 16 and 17 are cross-sectional views at different points along the length of the fishing rod shown in Fig. 15 illustrating the smaller diameter that results from the usual tapering of the fishing rod.

It will now be seen that we have outlined our new process of making a fishing rod and have also described a fishing rod made in accordance with said new process. It may be noted that as the hardening of one surface of our slab of wood is brought about by our treatment of the wood by natural or synthetic resin or other like-acting substance we are enabled to control the extent of this hardening by controlling the extent and conditions during the treatment of said surface by said treating materials and in this way we are enabled to get a more scientific and more satisfactory hardened surface for the outside surface of the fishing rod and by so controlling the extent or conditions of such treatment we are enabled to control the extent to which the said treatment penetrates into the fiber of the wood and so we are able to get scientifically a more usable and satisfactory form of wood fiber through the interior mass of our fishing rods so that said rods will have the desired combination not only of an extremely hard and durable outside surface but will have the proper characteristics of strength, stiffness and resiliency to make the united strips of our fishing rods noticeably stronger and more desirable from a fisherman's point of view.

We have referred to the shaping of the small rectangular pieces or strips 23 into tapered and beveled strips 25 or 26 as one step in our invention and so we believe it to be. But it will be understood that this step may involve more than one hand or machine operation such for example as having one operation trim the strips to be roughly tapered and/or beveled but relying upon a further operation to bring the strips to the required perfection, regularity and smoothness of both bevel and taper or of either of those shapes.

One modification of our invention consists in providing pieces of wood that are to be treated by the resin or resin-like substance of such size as to make only one tapered and beveled strip. This modification is illustrated in Figs. 18, 19 and 20. Fig. 18 is an isometric view on a somewhat enlarged scale of a piece of suitable wood 31 that is only large enough to have formed therefrom by tapering and beveling only one tapered and beveled strip 34 triangular in cross section and of proper size to make with other similar shaped and sized pieces a fishing rod of the desired number of equal sides.

Fig. 19 is a similar view of the said piece of wood 31 after one surface 32 has been coated or treated with the said resin or resin-like substance and has made that one surface 32 extremely hard like the outside surface of native bamboo and also has strengthened the fiber of the wood to some considerable extent beneath the surface 32.

These pieces 31 having the said hardened surface are then beveled and tapered to form the tapered and beveled strips 34 but leaving the hardened surface 32 untouched except that it is narrowed down incident to the tapering operation. The faces adjacent the hardened outside surface 32 are beveled away until they meet and form the triangular strip 34 having the converging beveled faces 33 of Fig. 20. These strips as shown in Fig. 20 are adapted to be placed six in a set and to have the faces 33 of adjacent strips in a set cemented together forming seams or joints radiating outwardly from the center of the rod to form a hexagonal rod as shown in Fig. 6 and as already described with regard to the first form of our invention. It will be obvious that the pieces of wood 31 of Figs. 18 and 19 can be beveled to a sharper angle, viz forty-five degrees between the faces 33 to form an octagonal rod.

We may add that we consider the first described process to be our preferred form. The treating of the thin slabs of wood 20 with said resin or resin-like substances not only hardens the one treated surface but strengthens the whole body of the wood so that it will better stand the operation of the cutting into the smaller strips 23.

It will be understood that for the tip lengths of fishing rods and for many intermediate lengths of rods the original thin slabs of wood 20 will be not much thicker than veneer and needs the reenforcement of the resin treatment to enable the thin slab 20 to be cut into the small strips 23 without slivering or breaking the wood. The process of Figs. 18–20 is well adapted for larger rods of the thicker lengths such as the butt or handle lengths. Here the pieces of wood are large enough to stand the strain of being cut or sawed into the strips 31 of Fig. 18 without injury to said strips.

What we claim as new and desire to secure by Letters Patent is:

1. The process of making a built-up fish rod which consists of cutting wood into thin slabs in line with the grain, coating one wide face of these slabs with a resinous material thereby making a hard outside surface and strengthening the fibers of the wood, cutting said slabs lengthwise into smaller strips, each having a part of said hardened outside surface, shaping each smaller strip to be tapered lengthwise while still retaining its hardened outside surface and beveling the other faces of said strip so that the proper number of tapered and beveled strips will fit closely together at radiating joints to form a solid body and finally cementing the beveled surfaces of the adjacent strips of a set thereof together.

2. The process of making a built-up fish rod which consists of cutting wood into thin slabs in line with the grain, treating one wide face of these slabs with a resinous material thereby making a hard outside surface and strengthening the fibers of the wood, cutting said slabs lengthwise into smaller strips, each having a part of said hardened outside surface, shaping each smaller strip to be tapered lengthwise while still retaining its hardened outside surface and beveling the other faces of said strip so that the proper number of tapered and beveled strips will fit closely together at radiating joints to form a solid body and finally cementing the beveled surfaces of the adjacent strips of a set thereof together.

3. The process of making a built-up fish rod which consists of cutting wood into thin slabs in line with the grain, coating one wide face of these slabs with a resin thereby making a hard outside surface and strengthening the fibers of the wood, cutting said slabs lengthwise into smaller strips, each having a part of said hardened outside surface, shaping each smaller strip to be tapered lengthwise while still retaining its hardened outside surface and beveling the other faces of said strip to form an angle with each other of sixty degrees so that six of said tapered and beveled smaller strips will fit closely together to form a hexagonal length of fish rod and finally cementing the beveled surfaces of the adjacent strips of a set thereof together.

4. The process of making a built-up fish rod which consists of cutting wood into thin slabs in line with the grain, coating one wide face of these slabs with a resin thereby making a hard outside surface and strengthening the fibers of the wood, cutting said slabs lengthwise into smaller strips, each having a part of said hardened outside surface, shaping each smaller strip to be tapered lengthwise while still retaining its hardened outside surface and beveling the other faces of said strip to form an angle with each other of forty-five degrees so that eight of said tapered and beveled smaller strips will fit closely together to form an octagonal length of fish rod and finally cementing the beveled surfaces of the adjacent strips of a set thereof together.

5. The process of making a built-up fishing rod which consists of providing strips of wood slightly larger than the triangular strips used in making a polygonal rod of the desired number of exterior sides, treating one side of each of said strips with a resinous material thereby making one hard outside surface on said strip and strengthening the fibers of the wood, shaping each of said strips to be triangular in cross section and to be tapered longitudinally while still retaining its hardened outside surface in a slightly tapering form, the bevel of the two sides other than the said outside surface being at such a bevel as will cause the proper number of said strips to fit closely together at radiating joints to form a solid body and finally cementing the beveled surfaces of the adjacent strips of a set thereof together.

EDWARD D. IBBOTSON.
EUGENE SCHMIDT.